United States Patent
Ebato et al.

(10) Patent No.: US 10,871,761 B2
(45) Date of Patent: Dec. 22, 2020

(54) NUMERICAL CONTROLLER

(71) Applicant: FANUC CORPORATION, Yamanashi (JP)

(72) Inventors: Norihito Ebato, Yamanashi (JP); Kazuo Sato, Yamanashi (JP); Takahiko Endo, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 80 days.

(21) Appl. No.: 16/201,349

(22) Filed: Nov. 27, 2018

(65) Prior Publication Data

US 2019/0163163 A1 May 30, 2019

(30) Foreign Application Priority Data

Nov. 28, 2017 (JP) ................................. 2017-228346

(51) Int. Cl.
*G05B 19/406* (2006.01)
*G06N 20/00* (2019.01)

(52) U.S. Cl.
CPC .. *G05B 19/406* (2013.01); *G05B 2219/34475* (2013.01); *G06N 20/00* (2019.01)

(58) Field of Classification Search
CPC .................................................. G05B 19/406
USPC ............................................................ 700/81
See application file for complete search history.

(56) References Cited

U.S. PATENT DOCUMENTS

| | | | |
|---|---|---|---|
| 2012/0166142 A1 | 6/2012 | Maeda et al. | |
| 2012/0185221 A1* | 7/2012 | Mori ................... | H05K 13/0817 703/2 |
| 2015/0352679 A1 | 12/2015 | Yamamoto et al. | |
| 2019/0265657 A1 | 8/2019 | Inagaki et al. | |

FOREIGN PATENT DOCUMENTS

| | | |
|---|---|---|
| JP | 2004355330 A | 12/2004 |
| JP | 2007198918 A | 8/2007 |
| JP | 2011059790 A | 3/2011 |
| JP | 2013-13988 A | 1/2013 |
| JP | 2013008111 A | 1/2013 |
| JP | 2014-172107 A | 9/2014 |
| JP | 2017033526 A | 2/2017 |

OTHER PUBLICATIONS

Notice of Reasons for Refusal for Japanese Application No. 2017-228346, dated Jan. 21, 2020, with translation, 6 pages.

* cited by examiner

*Primary Examiner* — Mohammad Ali
*Assistant Examiner* — Joshua T Sanders
(74) *Attorney, Agent, or Firm* — RatnerPrestia

(57) ABSTRACT

A numerical controller that detects occurrence of an abnormality according to a neighborhood method includes a sampling value acquisition unit configured to collect sampling values indicative of a state of a machine or environment, wherein the sampling values are collected during normal machining and during operation; a learning unit configured to generate a set of the sampling values during the normal machining; and an abnormality degree determination unit configured to compute an abnormality degree on the basis of a distance between the sampling value during the operation and the set of the sampling values during the normal machining.

5 Claims, 10 Drawing Sheets

NUMERICAL CONTROLLER

CROSS-REFERENCE TO RELATED APPLICATIONS

This application is a new U.S. Patent Application that claims benefit of Japanese Patent Application No. 2017-228346, filed Nov. 28, 2017, the disclosure of this application is being incorporated herein by reference in its entirety for all purposes.

BACKGROUND OF THE INVENTION

1. Field of the Invention

The present invention relates to a numerical controller and in particular relates to a numerical controller capable of quantifying a degree of an abnormality in response to detection of occurrence of the abnormality and presenting a countermeasure in accordance with the scale of the abnormality.

2. Description of the Related Art

Various schemes have been traditionally proposed which enable a numerical controller to detect occurrence of an abnormality (typically a spindle collision or the like). Examples of the detection scheme to detect occurrence of an abnormality include threshold determination using a load current value and threshold determination using an acceleration sensor value.

Threshold determination using a load current value refers to a scheme in which a numerical controller monitors the load current value for each control axis to determine that a spindle collision has occurred if the value (estimated load torque) obtained by subtracting a theoretical current value related to machining from the load current value is equal to or larger than a predetermined value.

Threshold determination using an acceleration sensor value refers to a scheme in which a numerical controller reads a sensor value of the acceleration sensor attached to a spindle to determined that a spindle collision has occurred if the sensor value is equal to or larger than a predetermined value.

As prior art techniques that rely on these schemes, Japanese Patent Application Laid-Open No. 2014-172107 and Japanese Patent Application Laid-Open No. 2013-013988 may be mentioned. Japanese Patent Application Laid-Open No. 2014-172107 discloses a method of diagnosing the degree of collision and damage of a spindle system by acquiring displacement, acceleration, a current value, and feedback by a sensor. Japanese Patent Application Laid-Open No. 2013-013988 discloses a method of evaluating an operating condition by comparing a pattern of an output signal of a sensor during normal operation with an output signal of a sensor at the time of actual operation.

The traditional abnormality detection schemes as disclosed in Japanese Patent Application Laid-Open Nos. 2014-172107 and 2013-013988 both need to specify a threshold value as appropriate in advance of the intended detection process and acquire data at the time of abnormality. However, it is not easy to set an appropriate threshold value. For example, threshold determination using a load current value involves a problem that it is difficult to distinguish between heavy-duty cutting and spindle collision. Also, threshold determination using an acceleration sensor value involves a problem that it is difficult to distinguish between high-speed fast-forward and spindle collision. In addition, another problem is that a large amount of trial run time is required to sufficiently accumulate data at the time of abnormality.

A neighborhood method is one of the schemes for solving such a problem. According to the neighborhood method, an abnormality is detected depending on whether or not other normal sampling values (estimated load torque value and acceleration sensor value acquired during past normal operation) exist in the vicinity of the sampling value (e.g., the estimated load torque value and the acceleration sensor value acquired during operation). Specifically, according to the neighborhood method, when the input sampling value deviates from the sampling value in the normal state, it is determined that an abnormality has occurred. According to the neighborhood method, it is not necessary to set any threshold value prior to making the determination, and it is possible to obtain data necessary for the determination simply by making trial runs to acquire normal data.

However, while it is possible to detect the occurrence of an abnormality by the traditional neighborhood method, the degree of the abnormality cannot be quantified. In general, the countermeasures to be taken when an abnormality occurs differ depending on the degree of an abnormality. In the meantime, since the degree of the abnormality could not be numerically evaluated by the traditional methods, it was difficult to take appropriate countermeasures.

SUMMARY OF THE INVENTION

The present invention has been made in order to solve these problems and an object of the present invention is to provide a numerical controller capable of quantifying the degree of an abnormality in response to occurrence of the abnormality having been detected and presenting a countermeasure in accordance with the scale of the abnormality.

The numerical controller according to an embodiment of the present invention is a numerical controller detecting occurrence of an abnormality using a neighborhood method. The numerical controller includes: a sampling value acquisition unit configured to collect sampling values indicative of a state of a machine or environment, wherein the sampling values are collected during normal machining and during operation; a learning unit configured to generate a set of the sampling values during the normal machining; and an abnormality degree determination unit configured to compute an abnormality degree on the basis of a distance between the sampling value during the operation and the set of the sampling values during the normal machining.

The numerical controller according to an embodiment of the present invention further includes a countermeasure unit configured to present a countermeasure in accordance with the abnormality degree.

In accordance with the numerical controller according to an embodiment of the present invention, the countermeasure unit is configured to accumulate, in response to detection of the abnormality occurrence, an abnormality degree relating to the abnormality and a countermeasure to respond to the abnormality such that the abnormality degree and the countermeasure are associated with each other.

In accordance with the numerical controller according to an embodiment of the present invention, the abnormality degree determination unit is configured to define an approximation area constituted by a small square enclosing the sampling value during the normal machining and compute the abnormality degree on the basis of a length of a side of a square enclosing the sampling value during the operation in a state where the square and the small square are in contact with each other.

According to the present invention, it is made possible to provide a numerical controller that can quantify the degree of the abnormality in response to occurrence of the abnormality having been detected and present the countermeasure or countermeasures in accordance with the scale of the abnormality.

The foregoing and other objects and features of the present invention will become apparent from the following description of embodiments with reference to the accompanying drawings, in which:

DETAILED DESCRIPTION OF THE PREFERRED EMBODIMENTS

Figure 1:
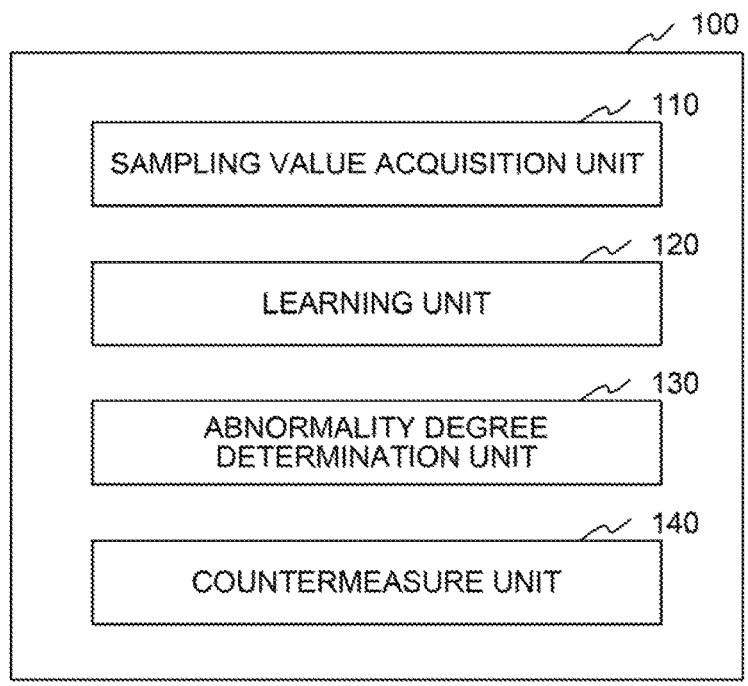
FIG. 1 is a block diagram illustrating the configuration of a numerical controller.

A numerical controller 100 according to embodiments of the present invention will be described hereinbelow with reference to the drawings. FIG. 1 is a block diagram that illustrates the functional configuration of the numerical controller 100. The numerical controller 100 includes a sampling value acquisition unit 110, a learning unit 120, an abnormality degree determination unit 130, and a countermeasure unit 140. The numerical controller 100 includes a central processing unit (CPU), a storage device, an input/output device, and other relevant units or devices. The individual components associated with the processing performed by the numerical controller 100 are logically implemented by the CPU executing the programs stored in the storage device.

The numerical controller 100 is configured to detect abnormalities among which a spindle collision may be mentioned here and determine the degree of the abnormalities (hereinafter referred to as "abnormality degree"). The numerical controller 100 is further configured to present to a user an appropriate countermeasure in accordance with the abnormality degree. The numerical controller 100 basically has at least two operating modes. The one is a training period in which sampling values in a normal state (which hereinafter may be simply referred to as "normal value") are collected to formulate a set of normal values, and the other is an operation period in which sampling values during operation are collected for comparison with the set of normal values to perform detection of an abnormal value and determination of the abnormality degree.

The sampling value acquisition unit 110 is configured to collect the sampling values during normal machining in the training period. The term "sampling value" as used herein refers to a value indicative of a state of a machine or environment, for example, an estimated load torque value and an acceleration sensor value acquired at a predetermined cycle. The estimated load torque value can be obtained by monitoring load current values for each control axis and subtracting a theoretical current value associated with the machining from the load current value. The acceleration sensor value can be obtained by reading the sensor value of the acceleration sensor attached to the spindle. The term "normal machining period" as used herein refers to a period of time during which the machining as intended by the user is performed without occurrence of any abnormality. The normal machining period may include periods of time associated with normal cutting, heavy-duty cutting, normal fast-forward, and high-speed fast-forward. Meanwhile, the sampling value acquired at the time of occurrence of an abnormality such as a spindle collision is excluded from what should be acquired by the sampling value acquisition unit 110.

Also, the sampling value acquisition unit 110 is configured to acquire a sampling value during operation. The term "during operation" as used herein refers to a period of time during which the machining is actually being performed and may include both of the normal machining period and an abnormality occurrence period.

Figure 2:
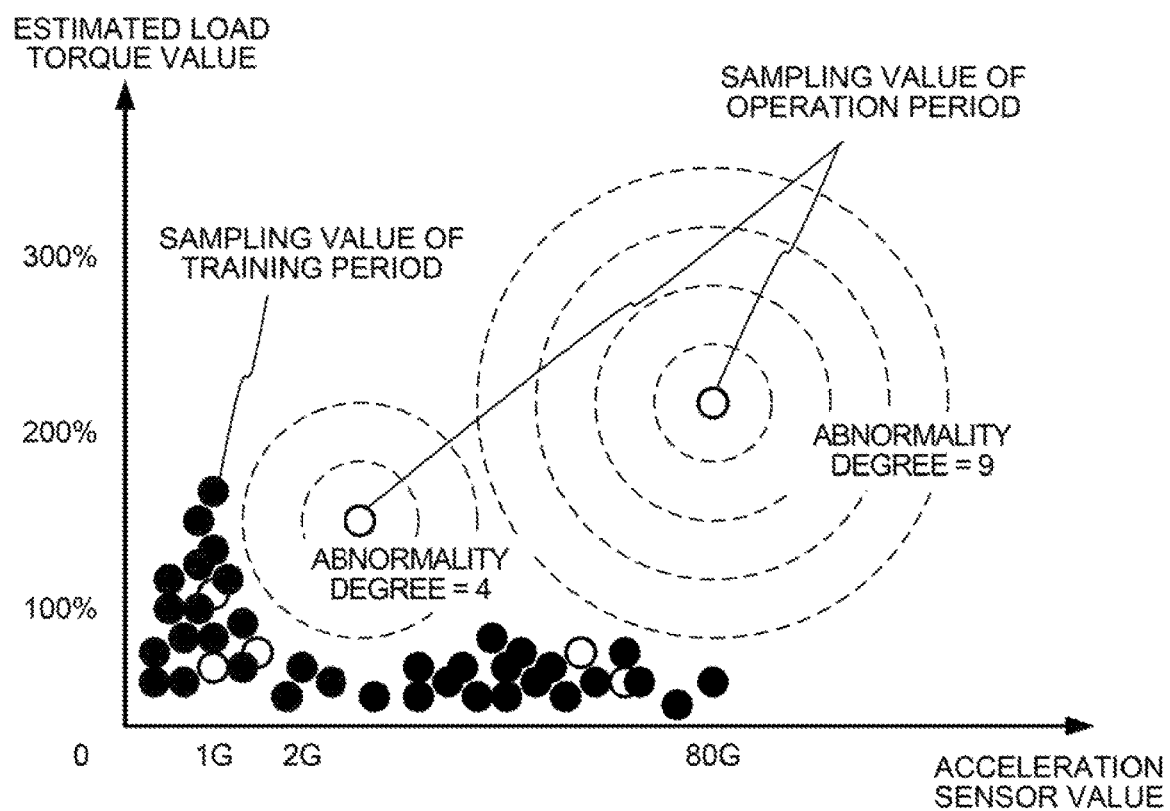
FIG. 2 is a diagram illustrating the outline of abnormality degree computation processing by the numerical controller.

The learning unit 120 is configured to acquire the sampling values acquired in a normal state, i.e., the normal values, by the sampling value acquisition unit 110 and generate a set of normal values (cluster). If the sampling value is constituted by an estimated load torque value and an acceleration sensor value, then the set of the normal values can be expressed, as illustrated in FIG. 2, as a set of dots plotted in a two-dimensional space whose axes indicate the estimated load torque value and the acceleration sensor value, respectively. It should be noted that the values included in the sampling value are not limited to values of two types and appropriate n types may be included. In this case, the set of the normal values will be expressed as a set of dots plotted in n-dimensional space.

The abnormality degree determination unit 130 is configured to acquire the sampling values acquired during the operation by the sampling value acquisition unit 110 and compute the abnormality degree on the basis of the distance between the sampling value that has been acquired and the set of the normal values generated by the learning unit 120. The abnormality degree determination unit 130 may regard that the occurrence of the abnormality has been detected when the distance between the sampling value acquired during the operation and the set of the normal values is equal to or larger than a predetermined value. In addition, the abnormality degree determination unit 130 can compute and output an abnormality degree which takes a larger value in response to a longer distance.

FIG. 2 illustrates the relationship between the distance between the sampling value during the operation and the set of normal values and the abnormality degree. Referring to FIG. 2, a black circle indicates a sampling value in a normal state (normal value) in the training period while a white circle indicates a sampling value during the operation. When the sampling value during the operation deviates from the set of normal values, the abnormality degree is computed in accordance with the distance of deviation. For example, it can be appreciated that the sampling value during the operation that has been determined as abnormality degree=9 corresponds to a longer distance from the set of normal values than the sampling value during the operation that has been determined as abnormality degree=4. In addition, the countermeasure that should be taken will also differ depending on the abnormality degree.

Figure 3:
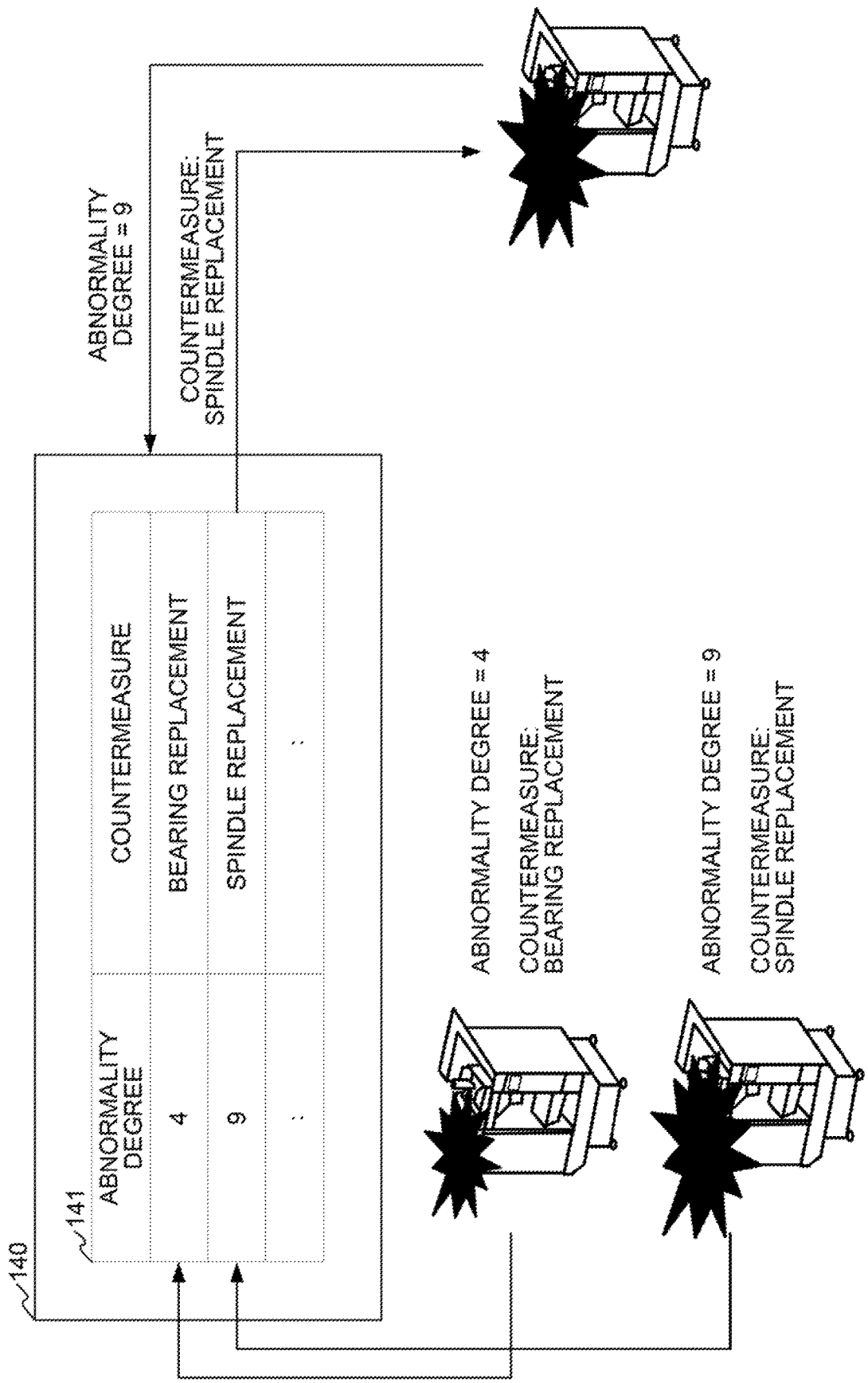
FIG. 3 is a diagram illustrating the outline of countermeasure presentation processing by the numerical controller.

The countermeasure unit 140 is configured to present a countermeasure in accordance with the abnormality degree that has been computed by the abnormality degree determination unit 130. For example, as illustrated in FIG. 3, the countermeasure unit 140 has a countermeasure database 141 in which the abnormality degrees are associated with the countermeasures. When the abnormality degree determination unit 130 has output the abnormality degree, the countermeasure unit 140 searches a countermeasure database 141 using the abnormality degree as a key and acquires the corresponding countermeasure. The countermeasure unit 140 then presents the countermeasure that have been acquired to the user by displaying the countermeasure that has been acquired on a not-shown display device of the numerical controller 100 or by any other suitable method.

The countermeasure database 141 typically stores the countermeasures that were taken when abnormalities had occurred in the past such that the countermeasures are associated with the abnormality degrees. For example, after an abnormality has been detected, the countermeasure unit 140 records the abnormality degree at the time and the countermeasures input by the user by a not-shown input/output device or any other suitable device in association with each other in the countermeasure database 141. As a result, countermeasure know-how by skilled operators for each abnormality degree is accumulated in the countermeasure database 141. Typically, the countermeasure will vary depending on the abnormality degrees. For example, if a spindle collision has occurred, the spindle is often damaged when the collision of the spindle is strong (when the abnormality degree is large), so that the primary countermeasure that should be taken will be replacement of the spindle. Meanwhile, if the collision of the spindle is relatively minor (if the abnormality degree is small), the primary countermeasure that should be taken will be replacement of bearings, or countermeasures may not be necessary depending on situations.

Example 1

An example of the operation of the numerical controller 100 in the training period and during the operation using the flowcharts of FIGS. 4 to 6 will be described as Example 1 below.

Figure 4:
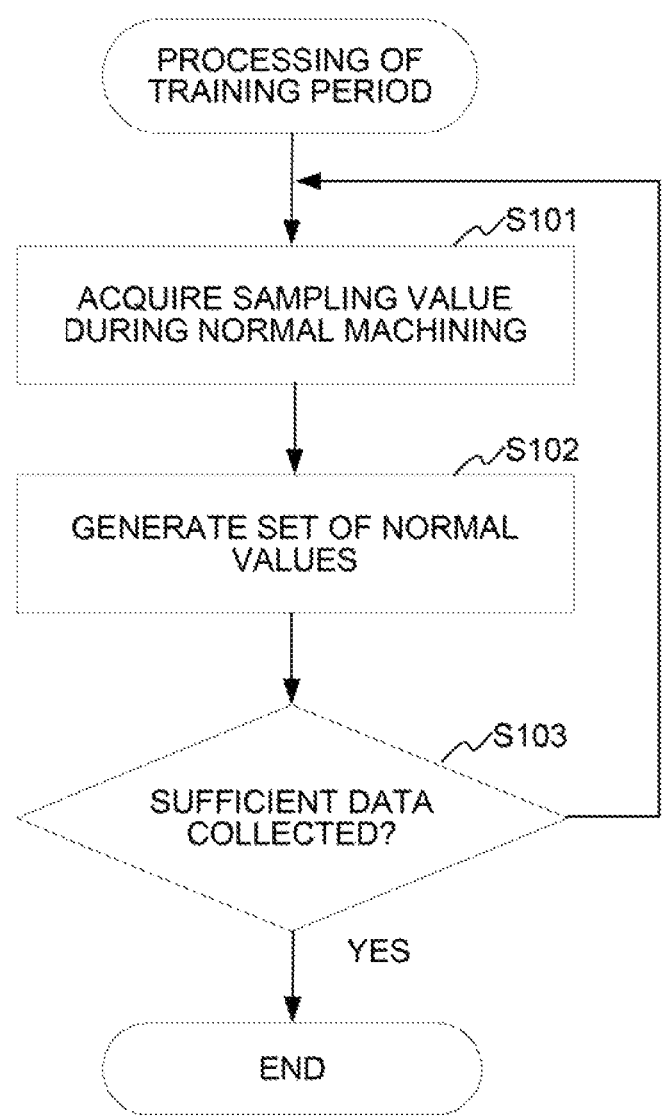
FIG. 4 is a flowchart illustrating the processing in a training period of the numerical controller.

FIG. 4 illustrates the processing in the training period.
S101: The sampling value acquisition unit 110 collects the sampling values during the normal machining.

For example, machining processes including normal cutting, heavy-duty cutting, normal fast-forward, and high-speed fast-forward are performed and the estimated load torque values and the acceleration sensor values during the processes are acquired.
S102: The learning unit 120 generates the set of normal values using the sampling values that have been acquired in the step S101.
S103: The processes of the steps S101 to S102 are repeatedly executed until sufficient data is gathered. When sufficient data has been successfully collected, the processing of the training period is terminated.

Figure 5:
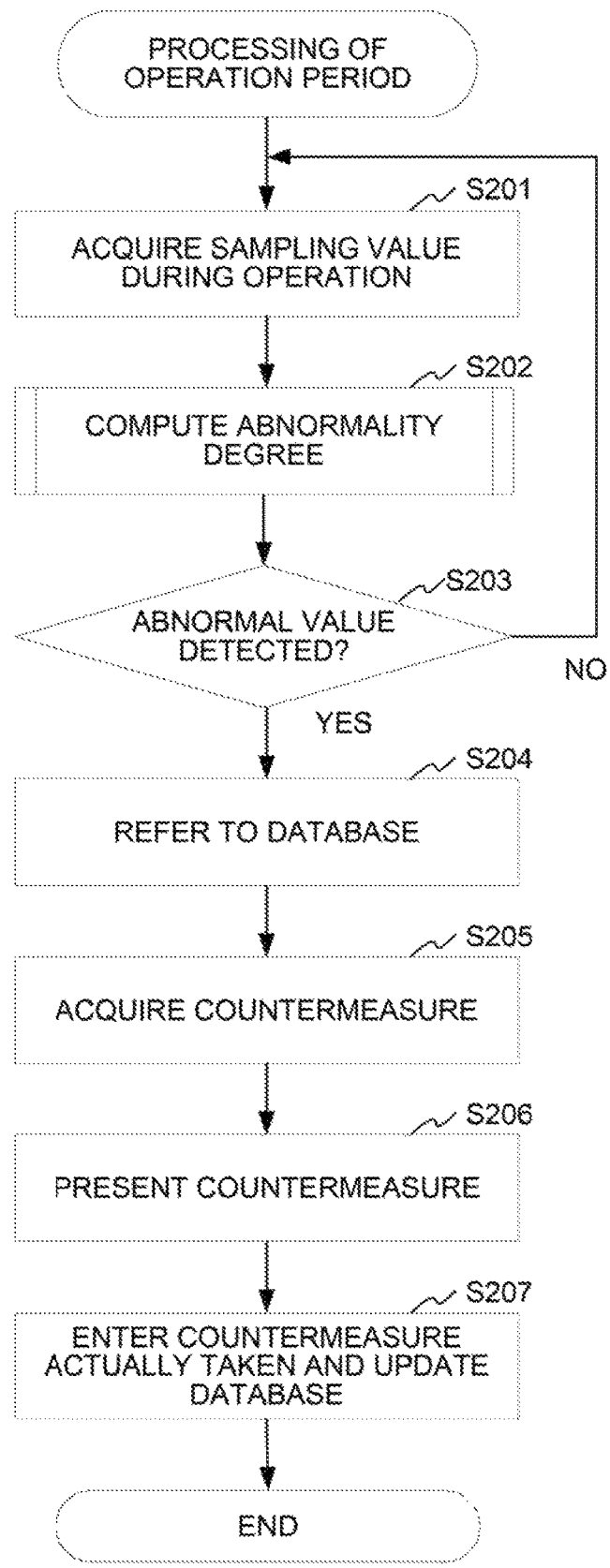
FIG. 5 is a flowchart illustrating the processing during operation of the numerical controller.
Figure 6:
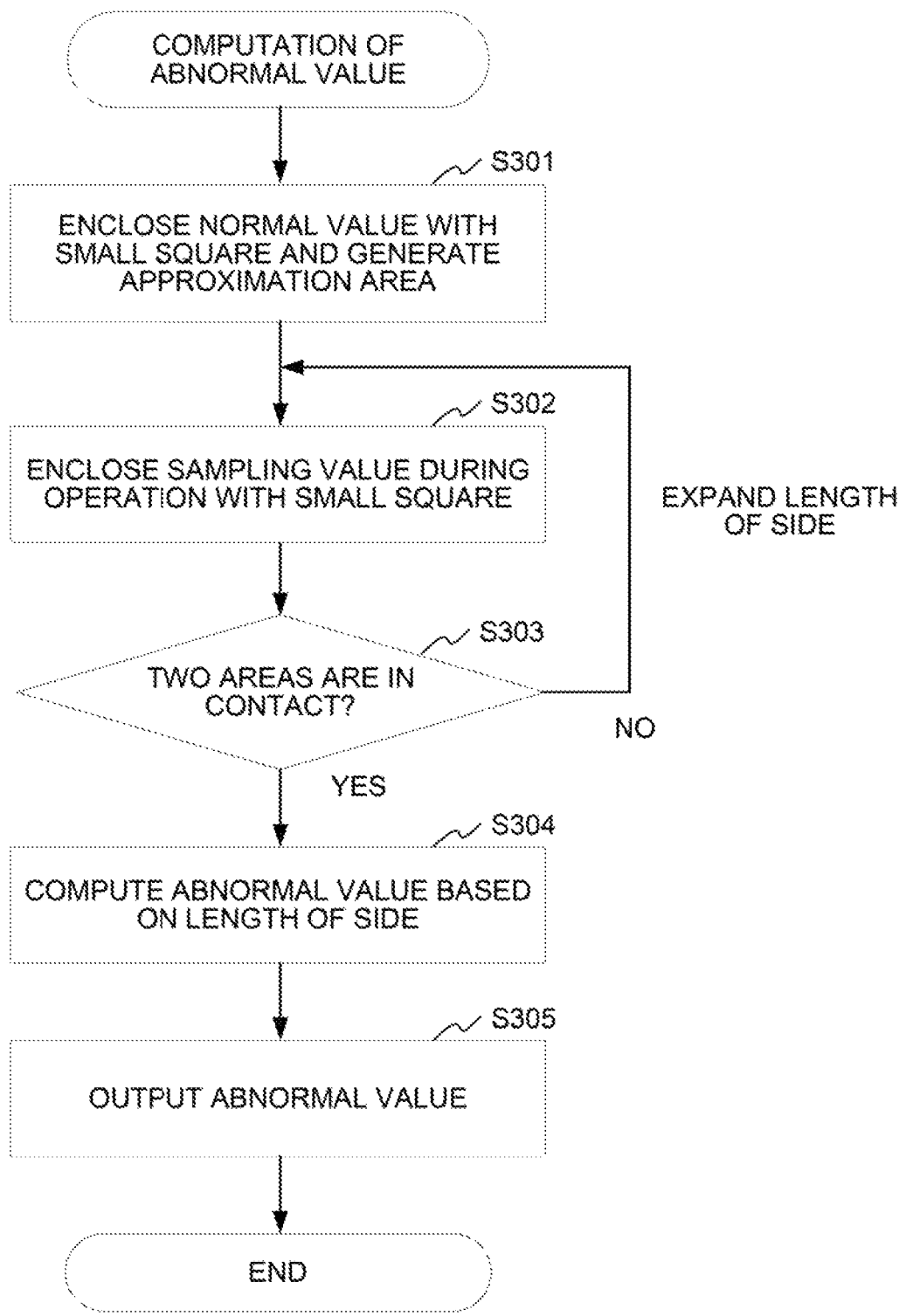
FIG. 6 is a flowchart illustrating the abnormality degree computation processing of the numerical controller.

FIG. 5 illustrates the processing during the operation.
S201: The sampling value acquisition unit 110 periodically collects the sampling values during the operation.
S202: The abnormality degree determination unit 130 carries out detection of the occurrence of an abnormality and computation of the abnormality degree on the basis of the distance between the sampling value that has been acquired in the step S201 and the set of normal values that were generated in the training period. The specific method for computing the abnormality degree will be described later.
S203: If the occurrence of an abnormality has been detected (the abnormality degree has been output) in the step S202, then transition is made to the step S204. In other cases, the processing from S201 onward is executed again.
S204: The countermeasure unit 140 refers to the countermeasure database 141 using as a key the abnormality degree that has been output in the step S202.
S205: The countermeasure unit 140 acquires the countermeasure associated with the abnormality degree in the countermeasure database 141.
S206: The countermeasure unit 140 presents to the user the countermeasure that has been acquired in the step S205 by displaying it on the display device of the numerical controller 100 or by any other suitable method.
S207: The countermeasure unit 140 accepts the input of the countermeasure the user has actually taken via the input device or the like of the numerical controller 100. The countermeasure unit 140 additionally registers the countermeasure that has been input in the countermeasure database 141 in association with the abnormality degree that has been output in the step S202.

An example of abnormality degree computation processing in the step S202 will be described using the flowchart of FIG. 6 and the graph of FIG. 7.
S301: The abnormality degree determination unit 130 encloses each of the normal values that constitute the set that has been generated in the step S102 with a small square and sets an area obtained by connecting all of these squares as an approximation area of the normal value. Here, it is preferable that the length of one side of the small square is defined according to the expression (1) or the expression (2) using the distance X between a certain normal value and another normal value closest to the certain normal value. By virtue of this, it is made possible to make 99.7% or 95.5% of the normal values fall within the approximation area in accordance with normal distribution.

Length of one side=Average of $X$+Three times the standard deviation of $X$  (1)

Length of one side=Average of $X$+Twice the standard deviation of $X$  (2)

Figure 7:
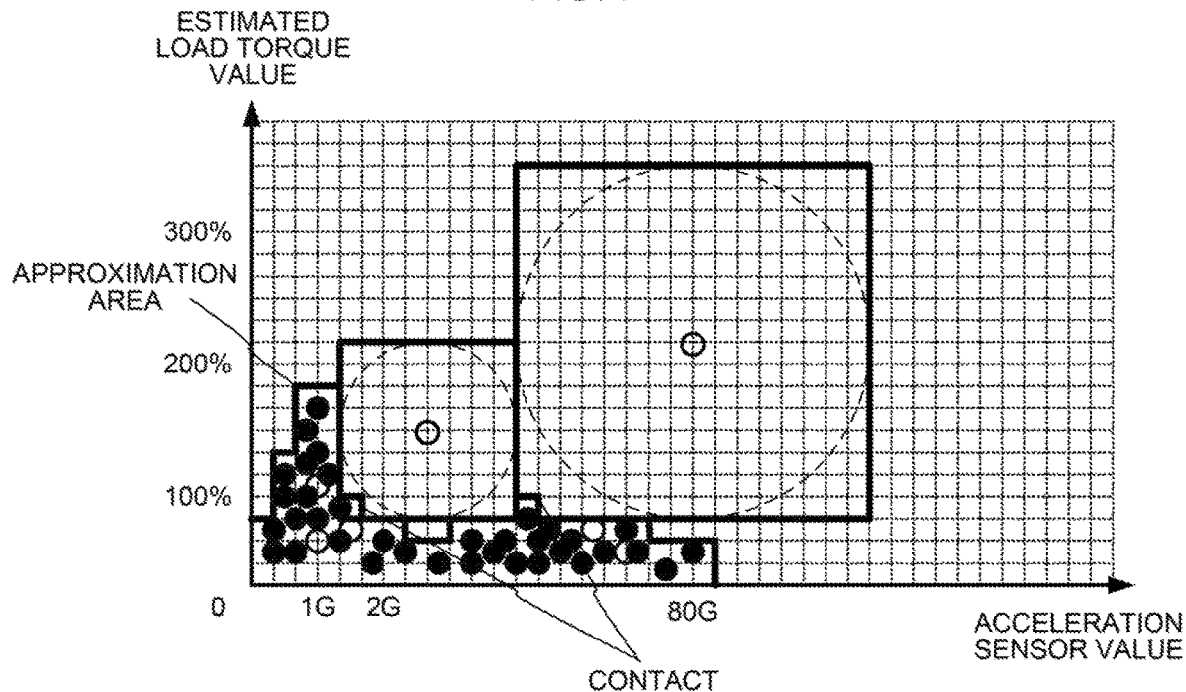
FIG. 7 is a diagram illustrating the outline of the abnormality degree computation processing of the numerical controller.

Note that FIG. 7 illustrates an example of the approximation area.
S302: The abnormality degree determination unit 130 encloses the sampling value during the operation that has been acquired in the step S201 with a small square. Here, the length of one side of the small square is defined according to the expression (3), where the initial value of n is 1.

The length of one side computed by the expression (1) or (2)*n    (3)

S303: The abnormality degree determination unit 130 determines whether or not the small square in the step S302 and the approximation area in the step S301 are in contact with each other. Specifically, the presence or absence of the contact can be determined by determining whether or not there exists any agreement between coordinates inside of the small square in the step S302 and coordinates inside of the approximation area in the step S301. If the contact has been determined, transition is made to the step S304. If the presence of the contact has not been confirmed, "n" in the expression (3) is incremented by 1 for re-computation according to the expression (3) to increase the length of one side of the small square in the step S302, and the processes at and after the step S302 are executed again.

By virtue of this, the small square in the step S302 is enlarged until it is brought into contact with the approximation area in the step S301. FIG. 7 illustrates an example of the small square in the step S302 which is enlarged so as to be in contact with the approximation area in the step S301.

S304: The abnormality degree determination unit 130 computes the abnormality degree according to the expression (4) using the length of one side of the small square in the step S302 when it is in contact with the approximation area in the step S301:

Abnormality degree=Length of one side/2    (4)

S305: The abnormality degree determination unit 130 outputs the abnormality degree computed in the step S304.

It should be noted that a circle may be used in place of the small square to form an area enclosing the normal value and/or the sampling value during the operation and then the presence or absence of the contact between the two areas as described above may be examined to compute the abnormality degree. When a circle is used, it is possible to evaluate more accurately the distance between the set of normal values and the sampling value during the operation. Alternatively, it also pertains to the scope of the present invention to use shapes other than a circle. Meanwhile, in this example, the method using the small square is adopted to suppress the amount of computation within a reasonable range.

Example 2

Another example of the operation of the numerical controller 100 in the training period and during the operation using the flowcharts of FIG. 8 and FIG. 9 will be described as Example 2 below.

Figure 8:
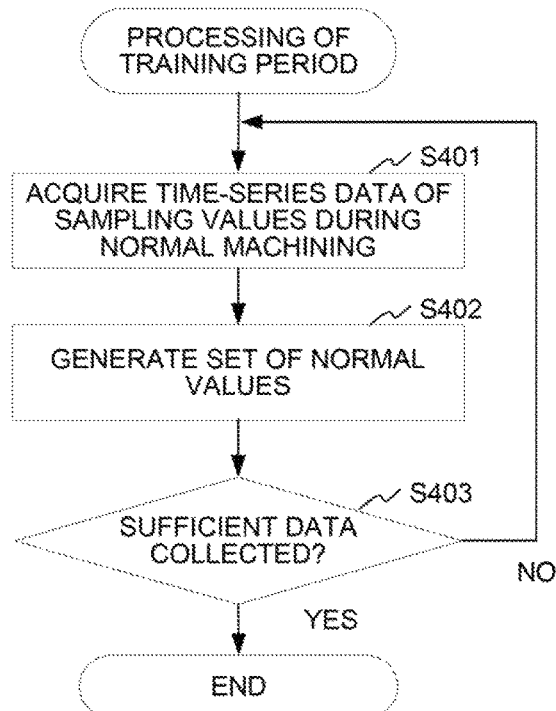
FIG. 8 is a flowchart illustrating the processing in the training period of the numerical controller.

FIG. 8 illustrates the processing in the training period. S401: The sampling value acquisition unit 110 collects time-series data of the sampling value during the normal machining. For example, processes including normal cutting, heavy-duty cutting, normal fast-forward, and high-speed fast-forward are carried out and the sampling value acquisition unit 110 collects the estimated load torque value, the acceleration sensor value, and information on the acquisition time of the sampling values during these processes. Here, the information on the acquisition time of the sampling values should be any piece of information that indicates the order of acquisition of the sampling values and may be, for example, the date of acquisition of the sampling value, serial numbers assigned every time the acquisition of the sampling value is made, and the like.

In this example, a sampling value acquired in any appropriate time T is referred to as $X_T$. If the sampling value that was acquired at a particular time t is $X_t$, then the sampling value that will be acquired next time, i.e., at the time t+1 is $X_{t+1}$.

S402: The learning unit 120 generates the set of normal values using the sampling value that has been acquired in the step S401.

S403: The processes of the steps S401 to S402 are repeatedly executed until sufficient data is gathered. When sufficient data has been successfully collected, the processing of the training period is terminated.

Figure 9:
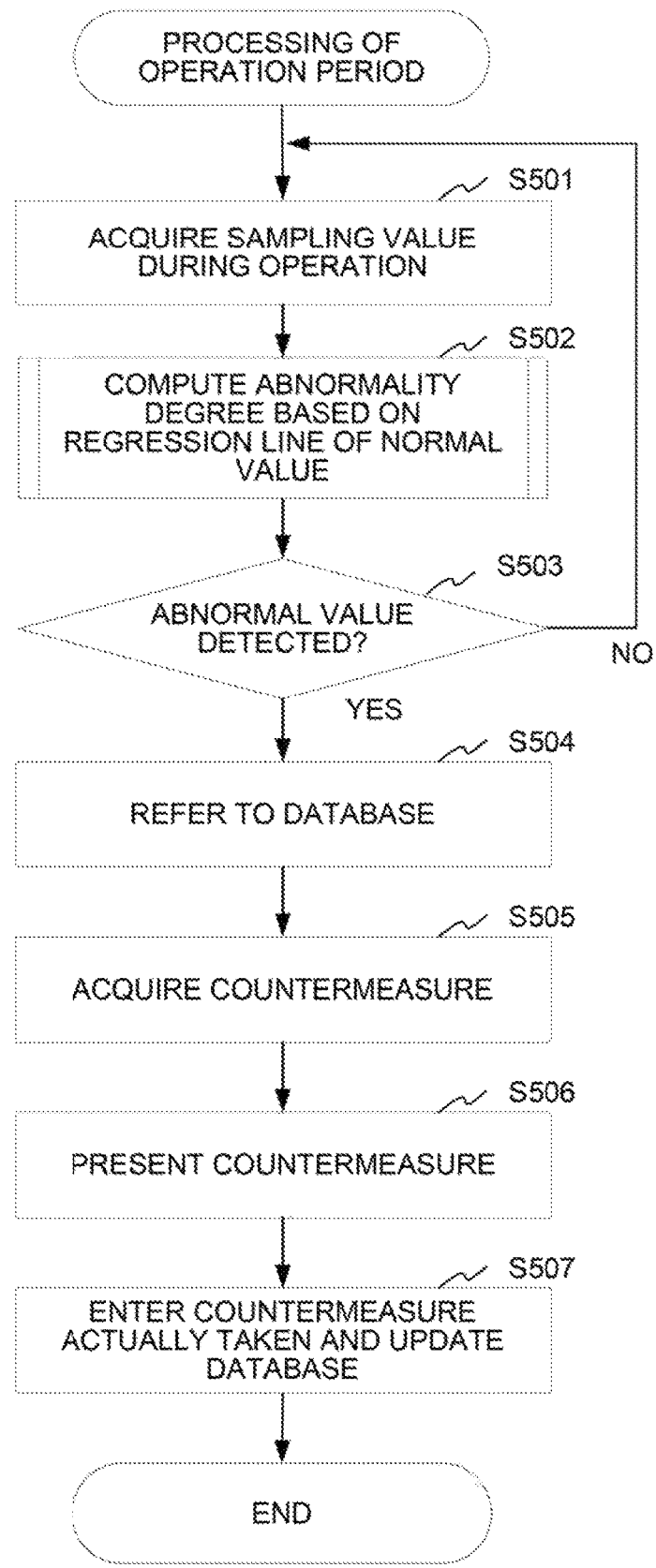
FIG. 9 is a flowchart illustrating the processing during the operation of the numerical controller.

FIG. 9 illustrates the processing during the operation.

S501: The sampling value acquisition unit 110 periodically collects the sampling values during the operation.

S502: The abnormality degree determination unit 130 carries out detection of the occurrence of an abnormality and computation of the abnormality degree on the basis of the distance between the sampling value that has been acquired in the step S501 and the set of normal values that was generated in the training period. Specifically, the abnormality degree determination unit 130 in this example carries out detection of the occurrence of an abnormality and computation of the abnormality degree on the basis of the distance between the sampling value that has been acquired in the step S501 and the regression line computed from the set of normal values that was generated in the training period. The specific method for computing the abnormality degree will be described later.

S503: If the occurrence of an abnormality has been detected (the abnormality degree has been output) in the step S502, then transition is made to the step S504. In other cases, the processing from S501 onward is executed again.

S504: The countermeasure unit 140 refers to the countermeasure database 141 using as the key the abnormality degree that has been output in the step S502.

S505: The countermeasure unit 140 acquires the countermeasure associated with the abnormality degree in the countermeasure database 141.

S506: The countermeasure unit 140 presents to the user the countermeasure that has been acquired in the step S505 by displaying it on the display device of the numerical controller 100 or by any other suitable method.

S507: The countermeasure unit 140 accepts the input of the countermeasure the user has actually taken via the input device or the like of the numerical controller 100. The countermeasure unit 140 additionally registers the countermeasure that has been input in the countermeasure database 141 in association with the abnormality degree that has been output in the step S502.

Figure 10:
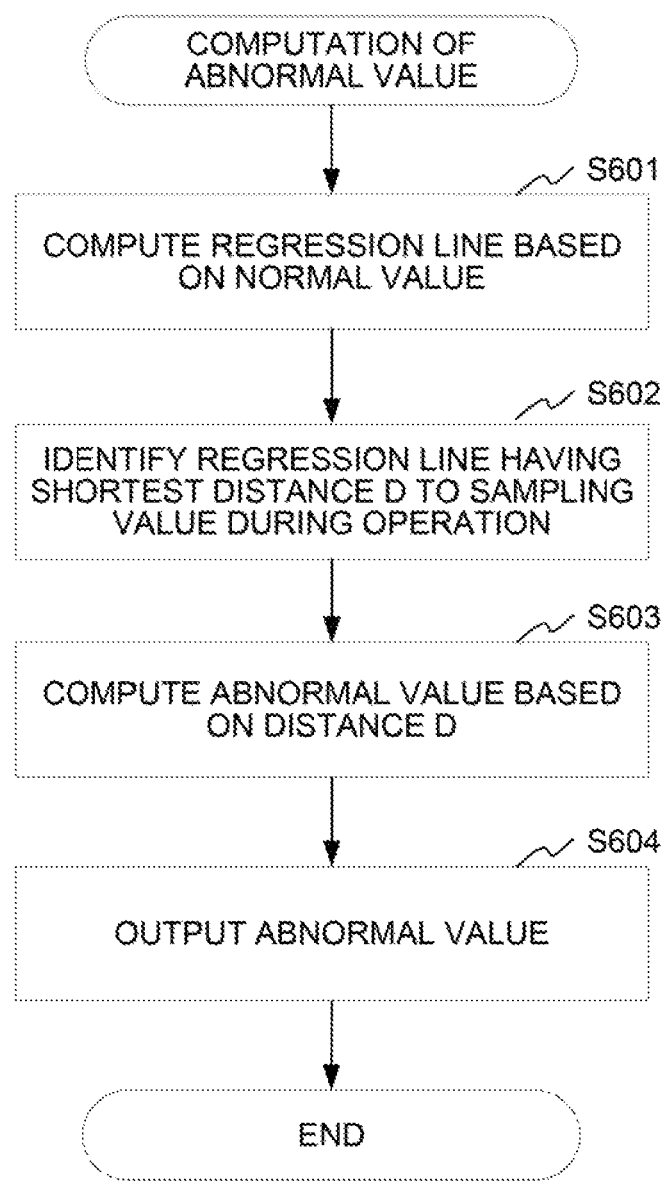
FIG. 10 is a flowchart illustrating the abnormality degree computation processing of the numerical controller.
Figure 11:
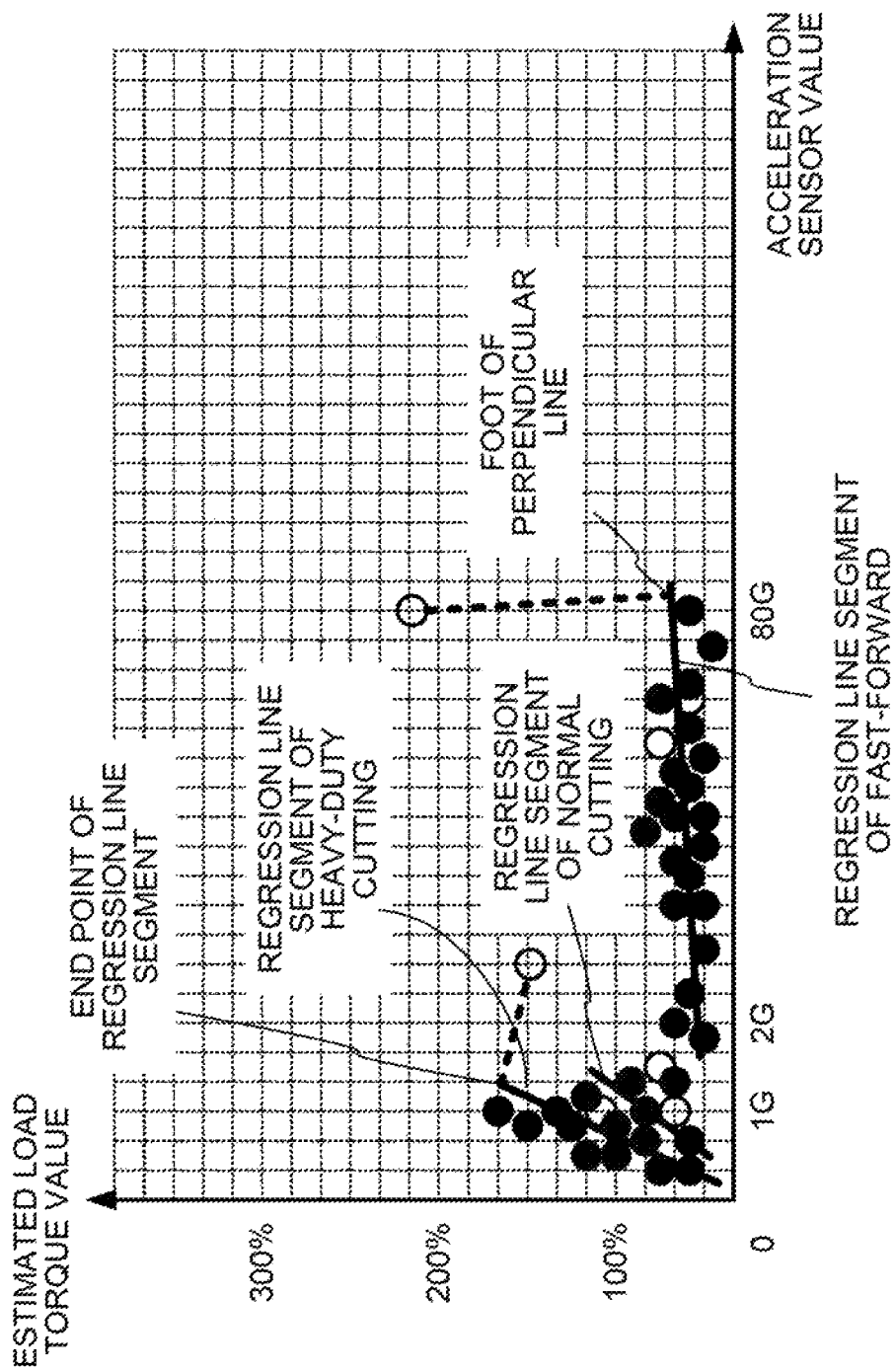
FIG. 11 is a diagram illustrating an example of the distribution of estimated load torque values and acceleration sensor values.

An example of abnormality degree computation processing in the step S502 will be described using the flowchart of FIG. 10 and the graph of FIG. 11.

S601: The abnormality degree determination unit 130 obtains one or more regression lines $L_P$ from the set of normal values $X_T$ generated in the step S402. For example, when the estimated load torque value and the acceleration sensor value have been acquired as the sampling values, then the abnormality degree determination unit 130 plots the sampling values $X_T$ in a two-dimensional space, whose axes are the estimated load torque value and the acceleration sensor value, respectively, and obtains the regression line $L_P$ to which the sampling values $X_T$ belongs.

In this example, the abnormality degree determination unit 130 can compute the regression lines $L_P$ which differ depending on the various types of motions (normal cutting, heavy-duty cutting, normal fast-forward, high-speed fast-forward, etc.) included in the operation in a normal state in accordance with the following procedure.

The abnormality degree determination unit 130 plots the normal values $X_T$ that have been acquired in the step S402 in a chronological order, i.e., such that the normal value $X_T$ that was acquired at the earliest time comes first. In addition, when a predetermined number of normal values $X_T$ have been plotted, then the abnormality degree determination unit 130 obtains the regression line $L_p$ in accordance with a least-square technique. It should be noted here that, since a regression line in a range where nothing is plotted is not meaningful, a regression line segment $L_p$ between the plotted value closest to the origin and the plot farthest from the origin will be practically obtained.

The abnormality degree determination unit 130, every time it plots a new $X_T$ (in other words, whose acquisition time is later), obtains the distance between the regression line segment and the plotted value. If the distance is equal to or smaller than a predetermined threshold value, it may regard that the new $X_T$ belongs to an existing regression line segment $L_p$. At this point, the abnormality degree determination unit 130 can compute again the regression line segment $L_p$ taking the new $X_T$ into account. Meanwhile, if the distance exceeds the predetermined threshold value, it may regard that the new $X_T$ does not belong to the regression line segment $L_p$. In addition, if multiple values $X_T$ that do not belong to the regression line segment $L_p$ have been consecutively acquired for a predetermined number of times, the abnormality degree determination unit 130 computes a new regression line segment $L_{p+1}$ based on multiple values $X_T$ that do not belong to the regression line segment $L_p$. Specifically, it obtains the regression line $L_{p+1}$ from the predetermined number of $X_T$ that do not belong to the regression line segment $L_p$ in accordance with a least-square technique. Thereafter in the same or similar manner a new regression line $L_p$ is defined every time a predetermined number of values $X_T$ that do not belong to the existing regression line segment are acquired.

Here, the respective regression lines $L_P$ are expected to indicate a characteristic of the sampling value in various types of motions (normal cutting, heavy-duty cutting, normal fast-forward, high-speed fast-forward, etc.). For example, when the processes are sequentially executed in order of normal cutting→heavy-duty cutting→normal fast-forward→high-speed fast-forward in the training period, then the abnormality degree determination unit 130 sequentially computes a regression line segment $L_1$ indicative of the normal cutting, a regression line segment $L_2$ indicative of the heavy-duty cutting, a regression line segment $L_3$ indicative of the normal fast-forward, and a regression line segment $L_4$ indicative of the high-speed fast-forward.

S602: The abnormality degree determination unit 130 identifies one regression line segment $L_P$ to which the distance D closest to the sampling value during the operation that has been acquired in the step S501 is close. It may be noted that, if it is not possible to draw a perpendicular line from the sampling value to the regression line segment $L_P$, the distance from the sampling value to the end point of the regression line segment $L_p$ may be regarded as the distance D.

S603: The abnormality degree determination unit 130 computes the abnormality degree according to the expression (5) using the distance D between the sampling value during the operation that has been acquired in the step S501 and the regression line segment $L_p$ that has been identified in the step S602.

$$\text{Abnormality degree} = \text{the length of one side computed according to the expression (1) or (2)} / \text{distance } D \quad (5)$$

S604: The abnormality degree determination unit 130 outputs the abnormality degree computed in the step S603.

Example 3

Figure 12:
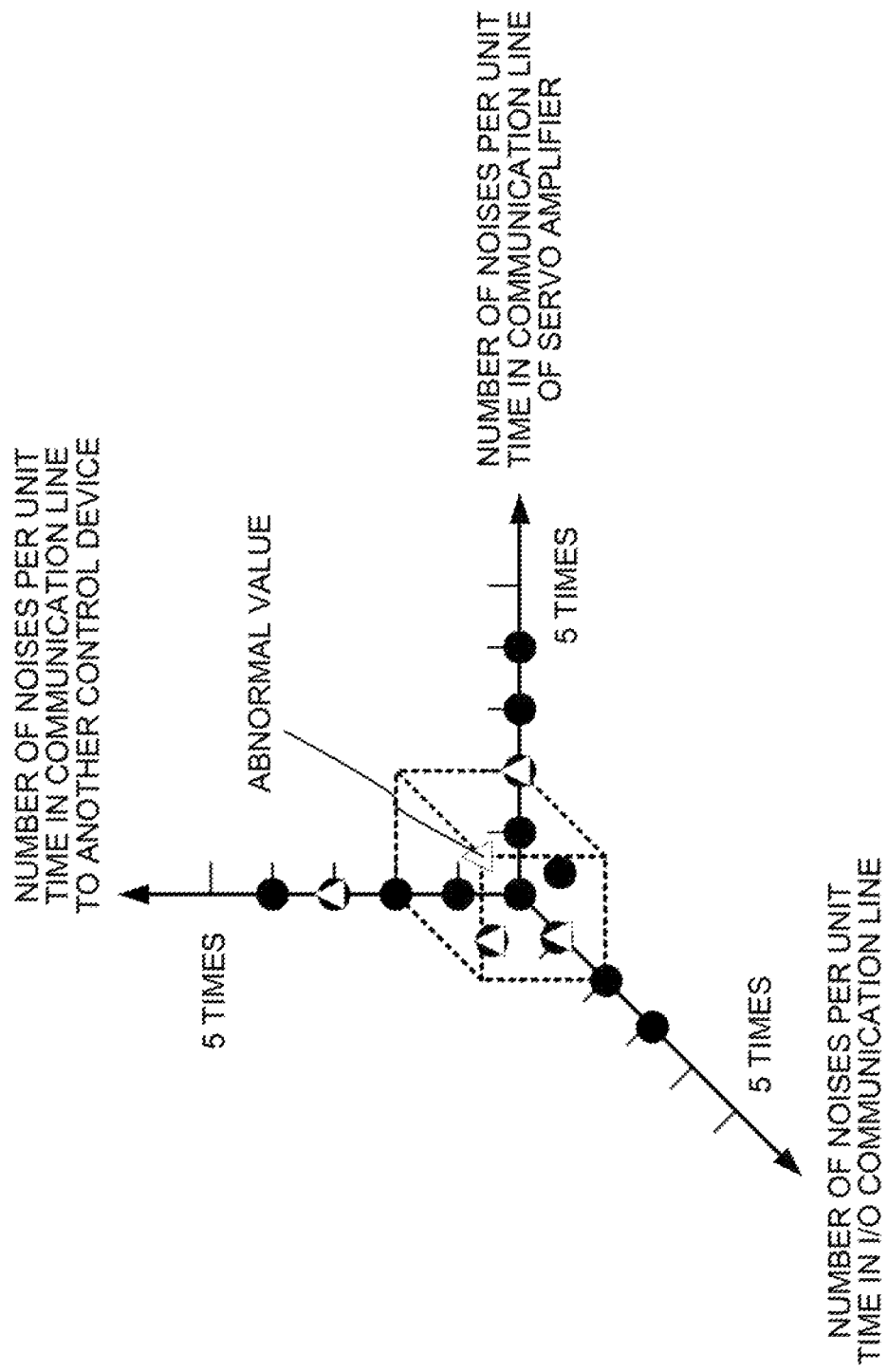
FIG. 12 is a diagram illustrating an example where the numerical controller 100 is implemented in the context of noise detection processing.

Finally, an example where the features of Example 1 or Example 2 are applied to noise detection processing will be described using FIG. 12 as Example 3.

In the training period, the sampling value acquisition unit 110 collects, as the sampling value during the normal machining, for example, the number of noise detected in a unit time in the I/O communication device; the number of noises detected in a unit time in a communication cable to a servo amplifier; and the number of noises detected in a unit time in a communication line to another numerical controller (S101 or S401).

The learning unit 120 collects a sufficient number of sampling values and generates the set of normal values (steps S102 to S103 or steps S402 to S403). FIG. 12 illustrates the sampling values acquired in the training period with black dots.

As a result, the numerical controller 100 is allowed to grasp the noise occurrence status in a normal state in actual system operation. For example, it is possible to grasp the fact that the actual frequency of occurrence of noise falls within a particular range which is smaller than the allowable range according to a communication standard.

In the operation period, the sampling value acquisition unit 110 periodically collects the sampling value during the operation (steps S201 or S501). In addition, the abnormality degree determination unit 130 carries out detection of the occurrence of an abnormality and computation of the abnormality degree on the basis of the distance between the acquired sampling value and the set of normal values that was generated in the training period (steps S202 or S502). FIG. 12 illustrates the sampling values acquired during the operation with white triangles. The area computed based on the distribution of the black dots or the white dot having a predetermined distance from the regression line is recognized as an abnormal value. When the occurrence of an abnormality has been detected, the countermeasure unit 140 refers to the countermeasure database 141 to acquire countermeasures for each abnormality degree and presents the countermeasure to the user. Also, it carries out the additional registration to the countermeasure database as necessary (steps S203 to S207 or steps S503 to S507).

By virtue of this, the numerical controller 100 detects as "abnormality" a peculiar situation when compared with the noise occurrence status in a normal state and can quantify the situation as the "abnormality degree." In general, communication devices are often capable of detecting noise occurring beyond the threshold that is allowable according to communication standards. However, according to this example, it is made possible to detect noise occurring in a behavior different from that in a normal state even when it does not exceed the threshold allowable under communication standards.

According to this embodiment, the numerical controller 100 detects the occurrence of an abnormality by a neighborhood method and computes the abnormality degree on the basis of the distance between the set of normal values and the sampling values in the abnormality occurrence period. As a result, it is not necessary to collect data in an abnormal state or define a threshold and the like in advance, so that it is made possible to readily detect an abnormality. In addition, it is also made possible to numerically express the degree of the abnormality that has occurred.

Also, the numerical controller 100 stores the abnormality degree and the countermeasure in association with each other and can present to the user the countermeasure corresponding to the computed abnormality degree. As a result, it is made possible to take an appropriate countermeasure in accordance with the abnormality degree.

Also, the numerical controller 100 computes the abnormality degree that is based on the distance between the sampling value in the abnormality occurrence period and the set of normal values. In particular, the numerical controller 100 defines the approximation area constituted by a small square enclosing the normal value. Also, it defines the small square that encloses the sampling value in the abnormality occurrence period and computes the abnormality degree on the basis of the length of the side of the small square in a state where the small square and the approximation area are in contact with each other. By virtue of this, it is made possible to effectively reduce the amount of processing required in the abnormality degree computation.

While the embodiments of the present invention have been described in the foregoing, the present invention is not limited to the above-described embodiments or examples, and can be implemented in various modes of implementation with changes and modifications made thereto as appropriate. For example, in the above-described embodiment, examples have been illustrated in which the collision of the spindle is detected as an abnormality, but the present invention is not limited thereto and can be applied to the detection of any other abnormality in an appropriate manner. Also, in the above-described examples, examples have been illustrated where a load current value and an acceleration sensor value are used as the sampling value, but the present invention is not limited thereto and any other value having correlation to an abnormality can be used as appropriate.

For example, the numerical controller 100 may be configured to detect malfunction of a motor or the like as an abnormality. In this case, for example, motor temperature, outside air temperature, etc. may be used as the sampling value. Also, in a case where the collision of the spindle is to be detected as the abnormality, the sound at the time of collision may be used as the sampling value.

Also, in the above-described examples, examples have been illustrated where sampling values of two types are used to perform detection of an abnormality and computation of an abnormality degree, but the present invention is not limited thereto and detection of an abnormality and computation of an abnormality degree can be performed using sampling values of any number of types as appropriate. For example, when sampling value of one single type is used, detection of an abnormality and computation of an abnormality degree can be performed on the basis of a one-dimensional distance between the sampling value in the abnormality occurrence period and the set of normal values. If sampling values of three types are used, then detection of an abnormality and computation of an abnormality degree can be performed on the basis of the distance between the sampling value in the abnormality occurrence period and the set of normal values in a three-dimensional space. Likewise, if sampling values of n types are used, then detection of an abnormality and computation of an abnormality degree can be performed on the basis of the distance between the sampling value in the abnormality occurrence period and the set of normal values in an n-dimensional space.

While the embodiments of the present invention have been described in the foregoing, the present invention is not limited to the examples of the above-described embodiments, and can be implemented in other modes of implementation with changes and modifications made thereto as appropriate.

The invention claimed is:

1. A numerical controller detecting occurrence of an abnormality using a neighborhood method, the numerical controller comprising:
   a processor configured to:
   collect sampling values indicative of a state of a machine or environment, wherein the sampling values are collected during a normal machining mode and during an operation mode;
   generate a set of the sampling values collected during the normal machining mode; and
   compute an abnormality degree on the basis of a two-dimensional distance between the sampling values collected during the operation mode and the set of the sampling values collected during the normal machining mode,
   wherein during the computation of the abnormality degree the processor is configured to:
   define an approximation area constituted by a small square enclosing each set of the sampling values generated during the normal machining mode,
   enclose the sampling values collected during the operation mode in another small square, and
   compute the abnormality degree on the basis of a length of a side of the another small square enclosing the sampling values during the operation mode and a side of the small square in contact with each other.

2. The numerical controller according to claim 1, wherein the processor is configured to present a countermeasure in accordance with the computed abnormality degree.

3. The numerical controller according to claim 2, wherein the processor is configured to accumulate, in response to detection of the occurrence of the abnormality, an abnormality degree relating to the abnormality and a countermeasure to correspond to the abnormality such that the abnormality degree and the countermeasure are associated with each other.

4. The numerical controller according to claim 1, wherein the processor is configured to compute the abnormality degree on the basis of a distance between the sampling values collected during the operation mode and a regression line based on the sampling values collected during the normal machining mode.

5. The numerical controller according to claim 1, wherein the processor is further configured to:
   determine whether or not there exists any contact between coordinates inside the square enclosing the sampling values collected during the normal machining mode and coordinates inside the approximation area; and
   compute the abnormality degree on the basis of the length of the side of the square, when the coordinates are determined to contact with each other,
   wherein when no contacts between coordinates are determined, the length of the side of the square is incremented and a presence of the contact is determined again.

* * * * *